(12) United States Patent
Maier et al.

(10) Patent No.: US 6,855,764 B2
(45) Date of Patent: Feb. 15, 2005

(54) METHOD FOR PRODUCING SELF-EMULSIFIABLE AQUEOUS POLYURETHANE RESINS HAVING IMPROVED CHARACTERISTICS

(75) Inventors: Alois Maier, Engelsberg (DE); Stefan Ingrisch, Seebruck (DE); Alfred Kern, Kirchweidach (DE)

(73) Assignee: SKW Bauchemie GmbH, Trostberg (DE)

( * ) Notice: Subject to any disclaimer, the term of this patent is extended or adjusted under 35 U.S.C. 154(b) by 308 days.

(21) Appl. No.: 10/129,291

(22) PCT Filed: Dec. 7, 2000

(86) PCT No.: PCT/EP00/12355

§ 371 (c)(1),
(2), (4) Date: Apr. 30, 2002

(87) PCT Pub. No.: WO01/42327

PCT Pub. Date: Jun. 14, 2001

(65) Prior Publication Data

US 2003/0004264 A1 Jan. 2, 2003

(30) Foreign Application Priority Data

Dec. 8, 1999 (DE) .......................................... 199 59 170

(51) Int. Cl.[7] .............................. C08J 3/00; C08K 3/20; C08L 75/00
(52) U.S. Cl. ........................ 524/591; 524/839; 524/840
(58) Field of Search ................................ 524/591, 839, 524/840

(56) References Cited

U.S. PATENT DOCUMENTS 6,635,723 B1 * 10/2003 Maier et al. ................. 525/459

FOREIGN PATENT DOCUMENTS

| DE | 198 12 751 A1 | 10/1999 |
| EP | 0 204 938 A | 12/1986 |
| WO | WO 99/50325 | * 10/1999 |

* cited by examiner

Primary Examiner—Patrick D. Niland
(74) Attorney, Agent, or Firm—Fulbright & Jaworski L.L.P.

(57) ABSTRACT

A method for producing self-emulsifiable, aqueous polyurethane resins by a) preparing a premix of polyol component including a least one diol having a molar mass of 500 to 5,000 Dalton, at least one polyhydroxyalkane at least one anionically modifiable dihydroxyalkane-carboxylic acid and 0 to 9 parts by weight of a solvent component in desired ratios; b) reacting a polyisocyanate component the premix from stage a) to give a polyurethane preadduct, c) reacting the polyurethane preadduct from stage b) with either the premix from stage a) or with an anionically modifiable dihydroxyalkanecarboxylic acid to give a polyurethane prepolymer; d) mixing the polyurethane prepolymer from stage c) with a prepared mixture of water, a neutralizing component and an antifoam component; and thereafter or simultaneously reacting the aqueous polyurethane prepolymer from stage d) with a chain-extending component which is diluted with water.

32 Claims, No Drawings

METHOD FOR PRODUCING SELF-EMULSIFIABLE AQUEOUS POLYURETHANE RESINS HAVING IMPROVED CHARACTERISTICS

DESCRIPTION

The present invention relates to a method for producing self-emulsifiable, aqueous polyurethane resins having improved characteristics and their use as binders in the building sector for one-component or two-component coatings, sealants, adhesives, finishes, membranes, sport floor coverings and seals.

From ecological, economic and physiological points of view, aqueous polyurethane dispersions are becoming increasingly important in construction chemistry applications. In construction chemistry, in particular isocyanate-free and low-solvent or solvent-free polyurethane dispersions having a sufficiently high solids content of polyurethane polymer and outstanding mechanical characteristics are desired, which dispersions can be made available with the aid of technically simple and at the same time universal production methods.

The chemistry and technology of the water-based polyurethanes has been known for many years and is described in detail in a large number of publications, for example D. Dieterich, K. Uhlig in *Ullmann's Encyclopedia of Industrial Chemistry, Sixth Edition* 1999 Electronic Release. Wiley-VCH; D. Dieterich in Houben-Weyl, *Methoden der Organischen Chemie* [Methods of Organic Chemistry]. Vol. E20, H. Bartl, J. Falbe (Editors), Georg Thieme Verlag, Stuttgart 1987, page 1641 et seq.; D. Dieterich, Prog. Org. Coat. 9 (1981) 281–330; J. W. Rosthauser, K. Nachtkamp, Journal of Coated Fabrics 16 (1986) 39–79; R. Arnoldus, Surf. Coat. 3 (Waterborne Coat.) (1990), 179–98.

The prepolymer mixing process and the solvent process for the production of polyurethane dispersions are generally known and are of considerable interest for industrial production.

In the prepolymer mixing process (cf. Patent Applications WO 98/05886, DE-A 197 53 222 and EP-A 0 919 579), large amounts of high-boiling and water-soluble solvents, such as, for example, N-methylpyrrolidone, are generally employed in order to reduce the viscosity of the polyurethane prepolymers. These solvents are no longer removed after the production of the polyurethane dispersion and remain in the end product. During the drying of the polyurethane dispersions or of the products produced therefrom, these solvents are liberated and enter the environment. The prepolymer mixing process is a one-pot synthesis in which all components are mixed together and are subjected to a polyaddition reaction to give a polyurethane prepolymer, which is then neutralized, dispersed and subjected to chain extension. This process is not only simple and efficient but also offers the possibility of producing polyurethane prepolymers having many synthetic variations.

In the solvent process or acetone process, the entire synthesis of the polyurethane polymers is carried out in the presence of large amounts of low-boiling and water-soluble solvents, for example, acetone or methyl ethyl ketone (cf. U.S. Pat. Nos. 5,804,647, 5,852,104, DE-A 197 19 515, U.S. Pat. No. 5,840,823 and EP-A 877 041). After the production of the polyurethane dispersion, the solvents have to be removed again by a complicated and expensive distillation, and the resulting polyurethane dispersions are therefore substantially solvent-free. Further advantages of the solvent process are the high solids contents, the excellent material properties and the small amounts of hydrophilic groups required for stabilizing the polyurethane dispersions. The solvent process is complicated to carry out and is economically not optimum, which is a major disadvantage particularly with regard to applications in construction chemistry.

There are also various combinations of prepolymer mixing process and solvent process (cf. DE-A 197 22 862), which are also not entirely without problems. The prepolymer mixing process can also be carried out, for example, using a mixture of low-boiling and high-boiling solvents, only the low-boiling fraction subsequently being removed by distillation. In the solvent process, for example, it is also possible to transfer the complete production of the polyurethane dispersion to the aqueous phase.

The prepolymer mixing process has some serious disadvantages. The mechanical characteristics (elongation, tensile strength, hardness) are generally unsatisfactory owing to the more or less uncontrollable reaction kinetics of the production method. In contrast to the solvent process, large amounts of low molecular weight diols are required for achieving a usable property profile, which in turn gives rise to an increased requirement for hydrophilic groups. When large amounts of hydrophilic groups (trialkylammonium carboxylate) are used for stabilization—in particular in the case of hydrophobic polymeric polyols as polyurethane backbones—problems occur at the stage of dispersing of the polyurethane prepolymer. The trialkylamine (neutralizing agent) present in equilibrium accelerates the isocyanate/water reaction to an extreme extent, with the result that a large part of the free isocyanate groups are lost in a short time. The processing time of the polyurethane prepolymer between the beginning of the dispersing and the end of the chain extension with polyamines is thus drastically limited. If the processing time is exceeded, the chain extender may no longer be completely incorporated, and the pH and the viscosity of the polyurethane dispersion increase considerably.

It was therefore the object of the present invention to provide a method for producing aqueous polyurethane dispersions which does not have the stated disadvantages of the prior art but can be realized in a technically simple and environmentally friendly manner.

This object was achieved, according to the invention, if a) first a premix of polyol component (A), consisting of 5 to 25 parts by weight of at least one diol (A) (i) having a molar mass of 500–5000 Dalton, 0.5 to 5 parts by weight of at least one polyhydroxyalkane (A) (ii) and 0 to 5 parts by weight of at least one anionically modifiable dihydroxyalkanecarboxylic acid (A) (iii), and 0 to 9 parts by weight of a solvent component (B) is prepared, b) 5 to 50 parts by weight of a polyisocyanate component (C) is reacted with 11 to 39 parts by weight of the premix from stage a) to give a polyurethane preadduct, the NCO/OH equivalent ratio in this stage being 1.75 to 8.0, c) the polyurethane preadduct from stage b) is reacted with either 5 to 33 parts by weight of the premix from stage a) or 0.5 to 5 parts by weight of an anionically modifiable dihydroxyalkanecarboxylic acid (A) (iii) to give a polyurethane prepolymer, the NCO/OH equivalent ratio in this stage being 1.5 to 8.0, in particular 1.5 to 5.0, d) the polyurethane prepolymer from stage c) is then mixed with a prepared mixture of 5 to 225 parts by weight of water, 0.5 to 4 parts by weight of a neutralizing component (D) and 0 to 1 part by weight of an antifoam component (E) and thereafter or simultaneously e) the aqueous polyurethane prepolymer from stage d) is reacted with 0.025 to 4 parts by weight of a chain-extending component (F) which is diluted with proportions of water from stage d) taken beforehand in the ratio of 1:10 to 10:1.

It has in fact surprisingly been found that the self-emulsifiable, aqueous polyurethane resins, produced on the basis of the method of the invention, not only are distinguished by a cost-effective and technically simple production method and excellent mechanical characteristics (tensile strength, elongation, hardness) but also have good performance characteristics (solids content, particle size, viscosity) and improvements in the stability, which was also not foreseeable.

The method according to the invention for producing self-emulsifiable, aqueous polyurethane resins operates according to a prepolymer mixing process with multiple modification and is defined by its stepwise synthesis. This synthesis process is carried out using the techniques customary in polyurethane chemistry.

In reaction stage a), first a premix of polyol component (A), consisting of 5 to 25 parts by weight of a diol (A) (i) having a molar mass of 500 to 5000 Dalton, 0.5 to 5 parts by weight of a polyhydroxyalkane (A) (ii) and 0 to 5 parts by weight of an anionically modifiable dihydroxyalkanecarboxylic acid (A) (iii), and 0 to 9 parts by weight of a solvent component (B) is prepared. The procedure of reaction stage a) is relatively unproblematic with regard to the reaction conditions. The components (A) (i), (A) (ii) and, if required, (A) (iii) and (B) are added and mixed in any desired sequence until a homogeneous solution is present. The reaction stage a) is carried out at a preferred temperature of 20 to 120° C., in particular at 60 to 80° C.

The component (A) (i) in an amount of 5 to 25 parts by weight consists of at least one relatively high molecular weight diol having two hydroxyl groups reactive toward polyisocyanates and an average molar mass (number average $M_n$) of 500 to 5000 Dalton, in particular 1000 to 4000 Dalton, in particular based on a polyether-, polyester- or α,ω-polymethacrylatediol or mixtures thereof. These are preferably polymeric diols, such as polyalkylene glycols, aliphatic or aromatic polyesters, polycaprolactones, polycarbonates, macromonomers, telechelic substances or epoxy resins or mixtures thereof. Polyalkylene glycols are obtained from monomers, such as ethylene oxide, propylene oxide, butylene oxide or tetrahydrofuran, by polymerization in the presence of boron trifluoride or by polyaddition with initiator compounds having reactive hydrogen atoms, such as water, alcohols, amines or bisphenol A. It is also possible to use mixtures of the monomers simultaneously or in succession. For example, polyethylene glycols, polypropylene glycols (e.g. Voranol® grades from Dow, Acclaim® grades from Arco Chemical), mixed polyglycols based on ethylene oxide and propylene oxide, and polytetramethylene glycols or polytetrahydrofurans (e.g. PolyTHF 2000 from BASF) can be used as suitable polyalkylene glycols. Linear or difunctional polypropylene glycols having an average molar mass (number average $M_n$) of 1000 to 4000 Dalton are preferably used.

Aliphatic or aromatic polyesterdiols are obtained via polycondensation reaction and/or polyaddition reaction from dihydric or polyhydric alcohols and dibasic or polybasic carboxylic acids, carboxylic anhydrides or carboxylic esters. For example, condensates based on 1,2-ethanediol or ethylene glycol, 1,4-butanediol or 1,4-butylene glycol, 1,6-hexanediol or 1,6-hexamethylene glycol and 2,2-dimethyl-1,3-propanediol or neopentylglycol and 1,6-hexanedioic acid or adipic acid and 1,3-benzenedicarboxylic acid or isophthalic acid (e.g. Bester grades from Poliolchimica) can be used as suitable aliphatic or aromatic polyesters. Polycaprolactones (e.g. Capa grades from Solvay Interox) and polycarbonates (e.g. Desmophen C 200 from Bayer) also belong to the group consisting of the polyesters. The former are obtained by reacting phosgene or aliphatic or aromatic carbonates, such as, for example, diphenyl carbonate or diethyl carbonate, with dihydric or polyhydric alcohols. The latter are prepared by polyaddition of lactones, such as, for example, ε-caprolactone, with initiator compounds having reactive hydrogen atoms, such as water, alcohols, amines or bisphenol A. Synthetic combinations of polyesters, polycaprolactones and polycarbonates are also possible. Linear or difunctional aliphatic or aromatic polyesterpolyols having an average molar mass (number average $M_n$) of 1000 to 4000 Dalton are preferred.

Also suitable are macromonomers, telechelic substances or epoxy resins. Polyhydroxyolefins, such as, for example, α,ω-dihydroxypolybutadienes, α,β-dihydroxypoly-(meth) acrylates, α,ω-dihydroxypoly(meth)acrylates or α,ω-dihydroxypolysiloxanes, are used as suitable macromonomers and telechelic substances. α,ω-Dihydroxypolyolefins, such as, for example, α,ω-poly(methyl methacrylate)diol (trade name: TEGO® Diol MD-1000) having a molar mass of 1000 Dalton, α,ω-poly(n-butyl methacrylate)diols having a molar mass of 1000 and 2000 Dalton (trade name: TEGO® Diol BD-1000, TEGO® Diol BD-2000) or α,ω-poly(2-ethylhexyl methacrylate)diol (trade name: TEGO® Diol OD-2000) from Tego Chemie Service GmbH, are preferred. The epoxy resins are preferably hydroxy-functional derivatives of bisphenol A diglycidyl ether (BADGE). Thus, linear or difunctional aliphatic or aromatic polyalkylene glycols, polyesterpolyols and α,ω-dihydroxypolyolefins having an average molar mass (number average $M_n$) of 1000 to 4000 Dalton are preferably used.

The component (A) (ii) in an amount of 0.5 to 5 parts by weight consists of at least one low molecular weight polyhydroxyalkane having two or more hydroxyl groups reactive toward polyisocyanates and a molar mass of 50 to 500 Dalton. For example, 1,2-ethanediol or ethylene glycol, 1,2-propanediol or 1,2-propylene glycol, 1,3-propanediol or 1,3-propylene glycol, 1,4-butanediol or 1,4-butylene glycol, 1,6-hexanediol or 1,6-hexamethylene glycol, 2-methyl-1,3-propanediol (trade name MPDiol Glycol® from Arco Chemical), 2,2-dimethyl-1,3-propanediol or neopentylglycol, 1,4-bis(hydroxymethyl)cyclohexane or cyclohexanedimethanol, 1,2,3-propanetriol or glycerol, 2-hydroxymethyl-2-methyl-1,3-propanol or trimethylolethane, 2-ethyl-2-hydroxymethyl-1,3-propanediol or trimethylolpropane, 2,2-bis(hydroxymethyl)-1,3-propanediol or pentaerythritol can be used as suitable low molecular weight polyhydroxyalkanes.

The component (A) (iii) in an amount of from 0 to 5 parts by weight consists of at least one low molecular weight and anionically modifiable dihydroxyalkanecarboxylic acid having two hydroxyl groups reactive toward polyisocyanates and one or more carboxyl groups inert toward polyisocyanates, some or all of which groups can be converted into carboxylate groups in the presence of bases. For example, 2-hydroxymethyl-3-hydroxypropanoic acid or dimethylolacetic acid, 2-hydroxymethyl-2-methyl-3-hydroxypropanoic acid or dimethylolpropionic acid, 2-hydroxymethyl-2-ethyl-3-hydroxypropanoic acid or dimethylolbutyric acid, 2-hydroxymethyl-2-propyl-3-hydroxypropanoic acid or dimethylolvaleric acid can be used as low molecular weight and anionically modifiable dihydroxyalkanecarboxylic acids. Bishydroxyalkanecarboxylic acids having a molar mass of 100 to 200 Dalton are preferably used, and preferably dimethylolpropionic acid (trade name DMPA® from Mallinckrodt).

The solvent component (B) in an amount of 0 to 9 parts by weight consists of at least one solvent which is inert toward polyisocyanates and completely or partly miscible in water and remains in the polyurethane dispersion after the preparation or is completely or partly removed by distillation. Solvents which remain in the dispersion after the preparation act as coalescence assistants. Suitable solvents are, for example, high-boiling solvents, such as N-methylpyrrolidone, dipropylene glycol dimethyl ether (Proglyde DMM® from Dow) or low-boiling solvents such as acetone or butanone, or any desired mixtures thereof. High-boiling and hydrophilic organic solvents having a boiling point above 180° C. (atmospheric pressure) are preferably used, and preferably N-methylpyrrolidone.

In reaction stage b), 11 to 39 parts by weight of the premix from stage a) are reacted with 5 to 50 parts by weight of a polyisocyanate component (C) to give a polyurethane preadduct, the NCO/OH equivalent ratio in this stage being 1.75 to 8.0. The NCO/OH equivalent ratio of the components (C) and (A) is preferably adjusted to a value of 2.5 to 4.0 in reaction stage b). The procedure for reaction stage b) is relatively noncritical with respect to the reaction conditions. The polyurethane preadduct is formed by adding a part of the premix from reaction stage a), consisting of the components A) (i), (A) (ii) and, if required, (A) (iii) and (B), to the component (C) within a period of a few minutes. The reaction stage b) is carried out at a preferred temperature of 60 to 120° C., in particular at 80 to 100° C. Owing to the large excess of polyisocyanate component (C) compared with the polyol component (A), very little solvent or no solvent may be employed in the reaction stage b), depending on the viscosity. Strictly NCO-terminated short-chain polyurethane preadducts result.

The polyisocyanate component (C) consists of at least one polyisocyanate, polyisocyanate derivative or polyisocyanate homologs having two or more aliphatic or aromatic isocyanate groups. In particular, the polyisocyanates sufficiently well known in polyurethane chemistry, or combinations thereof, are suitable. For example, 1,6-diisocyanatohexane (HDI), 1-isocyanato-5-isocyanatomethyl-3,3,5-trimethylcyclohexane or isophorone diisocyanate (IPDI), bis(4-isocyanatocyclohexyl)methane ($H_{12}$MDI), 1,3-bis(1-isocyanato-1-methyl-ethyl)benzene (m-TMXDI) or industrial isomer mixtures of the individual aromatic polyisocyanates can be used as suitable aliphatic diisocyanates. For example, 2,4-diisocyanatotoluene or toluene diisocyanate (TDI), bis(4-isocyanatophenyl)methane (MDI) and, if required, its higher homologs (polymeric MDI) or industrial isomer mixtures of the individual aromatic polyisocyanates can be used as suitable aromatic diisocyanates. Furthermore, the "coating polyisocyanates" based on bis(4-isocyanatocyclohexyl)methane ($H_{12}$MDI), 1,6-diisocyanatohexane (HDI) or 1-isocyanato-5-isocyanatomethyl-3,3,5-trimethylcyclohexane (IPDI) are also suitable in principle. The term "coating polyisocyanates" designates those derivatives of these diisocyanates which have allophanate, biuret, carbodiimide, isocyanurate, uretdione or urethane groups and in which the residual content of monomeric diisocyanates has been reduced to a minimum in accordance with the prior art. In addition, modified polyisocyanates which are obtainable, for example, by hydrophilic modification of "coating polyisocyanates" based on 1,6-disocyanatohexane (HDI) can also be used. The aliphatic polyisocyanates are preferred to the aromatic polyisocyanates. The aliphatic polyisocyanate used is preferably isophorone diisocyanate.

In the reaction stage c), the polyurethane preadduct from stage b) is then reacted with either 5 to 33 parts by weight of the premix from stage a) or 0.5 to 5 parts by weight of the anionically modifiable dihydroxyalkanecarboxylic acid (A) (iii) to give a polyurethane prepolymer, the NCO/OH equivalent ratio in this stage being 1.5 to 8.0. The NCO/OH equivalent ratio of the polyurethane preadduct from stage b) and of the component (A) is preferably adjusted to a value of 1.6 to 3.0 in reaction stage c). The polyurethane prepolymer is formed by adding the remainder of the premix from stage a), consisting of the components (A) (i), (A) (ii), A) (iii) and, if required, (B), to the polyurethane preadduct from stage b) within a period of a few minutes. The polyurethane preadduct used in reaction stage c) and obtained from reaction stage b) can, if required, also have free hydroxyl groups in addition to isocyanate groups when the process is carried out appropriately or reaction is incomplete. The reaction stage c) is carried out at a preferred temperature of 60 to 120° C., in particular at 80 to 100° C.

The preferred NCO/OH equivalent ratio of the total amount of the components (A) (polyols) and (C) (polyisocyanates) is adjusted to a preferred value of 1.2 to 2.2, in particular 1.4 to 2.0.

The reaction of the components (A) and (C) in the reaction stages b) and c) can be effected in the presence of a catalyst system customary for polyaddition reactions with polyisocyanates. If required, these catalysts are added in amounts of 0.01 to 1 part by weight, based on the reaction batch. Customary catalysts for polyaddition reactions with polyisocyanates are, for example, dibutyltin oxide, dibutyltin dilaurate (DBTL), triethylamine, tin(II) octanoate, 1,4-diazabicyclo[2.2.2]octane (DABCO), 1,4-diazabicyclo[3.2.0]-5-nonene (DBN) and 1,5-diazabicyclo[5.4.0]-7-undecene (DBU).

In the reaction stages b) and c), the reaction batch is stirred, preferably under an inert gas atmosphere, utilizing the exothermic nature of the polyaddition reaction, until the calculated or theoretical NCO content is reached. The required reaction times are in the region of a few hours and are decisively influenced by reaction parameters such as the reactivity of the components, the stoichiometry of the components and the temperature.

According to a preferred embodiment, the preparation of the polyurethane prepolymer is carried out by preparing a premix of the components (A) (i), (A) (ii), (A) (iii) and, if required, (B) in stage a) and then using the premix from stage a) in the stages b) and c).

Alternatively, a premix of the components (A) (i), (A) (ii) and, if required, (B) is prepared in stage a), the premix from stage a) is then used completely in stage b) and the component (A) (iii) is reacted only in stage c).

Owing to the changing NCO/OH equivalent ratios during the polyaddition reaction, this multistage addition of the polyol component leads to different reaction kinetics and hence to a composition of the polyurethane polymer which differs from that in the conventional prepolymer mixing process by the one-pot method. When the process is carried out in a suitable manner and diisocyanates having isocyanate groups of different reactivity are used, substantially symmetrical polyurethane preadducts and polyurethane prepolymers are obtained, in which the hydroxyl groups of the individual polyols react with isocyanate groups of the same reactivity. When the process is carried out in a suitable manner, in particular the distribution of the premix prepared in reaction stage a) over the reaction stages b) and c) is to be understood in this context. Diisocyanates having isocyanate groups of different reactivity moreover give narrower molar mass distributions with lower nonuniformity. Accordingly, polyurethane preadducts and polyurethane prepolymers which have a linear structure and are composed of diol and diisocyanate components are preferred. The formation of these symmetrical segmented structures is promoted by the mild temperature program during the polyaddition reaction. In the reaction stages b) and c), only a slight exothermicity of the polyaddition reaction is observable and the reaction temperature does not increase endogenously above 90° C. Consequently, undesired secondary reactions of the NCO groups, for example with carboxylate groups, can also be suppressed in a simple manner without particular temperature control.

The viscosity of the polyurethane prepolymers is relatively low and substantially independent of the structure of the polyol and polyisocyanate components used. An addition of solvents for reducing the viscosity or for improving the dispersing properties of the polyurethane prepolymers is therefore required only in small amounts. The particular structure of the polyurethane prepolymers subsequently makes it possible to produce products having extremely good mechanical characteristics and comparatively high solids contents. Moreover, owing to the uniform distribution of the carboxyl or carboxylate groups over the polyurethane polymer, only moderate charge densities are required for stabilizing the corresponding polyurethane dispersions.

In the reaction stage d), the polyurethane prepolymer from stage c) is mixed with a prepared mixture consisting of 5 to 225 parts by weight of water, 0.5 to 4 parts by weight of a neutralizing component (D) and 0 to 1.0 part by weight of an antifoam component (E). The reaction stage d) is carried out at a temperature of 20 to 80° C., preferably at 40 to 60° C. According to a preferred embodiment, the neutralizing component (D) is used in an amount such that the degree of neutralization, based on the free carboxyl groups of the polyurethane prepolymer, is 70 to 100 equivalent %, preferably 80 to 100 equivalent %. The neutralizing component (D) is initially introduced for complete or partial neutralization of the carboxyl groups in the dispersing medium (indirect neutralization). During the neutralization, the carboxyl groups are converted into carboxylate groups, which serve for anionic modification or stabilization of the polyurethane dispersion. Alternatively, the polyurethane prepolymer from reaction stage c) can, if required, also be stirred into the prepared mixture of water, the neutralizing component (D) and the antifoam component (E) or the neutralizing component (D) can, if required, also be stirred into the polyurethane prepolymer after reaction stage c) (direct neutralization).

All cationic ions to compensate the anionic carboxylate groups are dissolved in the dispersing medium. The terms "dispersing" or "dispersion" mean that solvated and/or suspended components may also be contained in addition to dispersed components having a micellar structure.

The neutralizing component (D) in an amount of 0.5 to 4 parts by weight consists of one or more bases which serve for complete or partial neutralization of the carboxyl groups. Tertiary amines, such as N,N-dimethylethanolamine, N-methyldiethanolamine, triethanolamine, N,N-dimethylisopropanolamine, N-methyldiisopropanolamine, triisopropylamine, N-methylmorpholine, N-ethylmorpholine, triethylamine or ammonia, and alkali metal hydroxides (NaOH, KOH) can be used as suitable bases. Tertiary amines and in particular triethylamine are preferably used.

The antifoam component (E) in an amount of 0 to 1 part by weight consists of one or more antifoams which are customary for polyurethane dispersions, serve for degassing (air, carbon dioxide) and counteract the foam formation. Hardened foam is not redispersible and otherwise settles out as a precipitate in the form of fine needles. Suitable antifoams are, for example, products of the companies Tego Chemie Service GmbH (TEGO® Airex 901 W and TEGO® Foamex 1488 grades), Byk Chemie (Byk 011, 019, 021, 022, 023, 024, 025, 026, 028 and 080 grades) or Condea (SERDAS GBR).

After the theoretical total NCO content has been reached, the polyurethane prepolymer is not dispersed in water, as in the processes often described in the patent literature (cf. patents U.S. Pat. Nos. 5,907,012, 5,900,457, 5,750,630) but, according to a preferred embodiment, is first covered with a layer of a mixture of water, a neutralizing component and an antifoam component without shear forces in the reaction vessel and finally completely dispersed with the aid of a dissolver with thorough stirring within a few minutes. This procedure has the advantage that dispersing can be effected in the reaction vessel itself and even polyurethane prepolymers of high viscosity are extremely easy to process. Here, the polyurethane prepolymer is not introduced slowly into the dispersing medium but is covered with a layer of the total amount of dispersing medium and then immediately stirred. As an alternative to this procedure, the polyurethane prepolymer from stage c) can be mixed into the prepared mixture of water, the neutralizing component (D) and the antifoam component (E).

With the use of identical formulations, the method, according to the invention, comprising multistage prepolymer synthesis and inverse method leads to polyurethane dispersions having somewhat higher solids contents and improved mechanical properties compared with the prepolymer mixing process. A further advantage of the dispersing method by covering the polyurethane prepolymer resin with a layer of the dispersing medium is the particularly high efficiency with which the polyurethane prepolymer is brought completely into the aqueous phase. Thus, no polyurethane prepolymer residues remain in the reactor or the pipelines, thus considerably facilitating the cleaning.

In the reaction stage e), the polyurethane prepolymer dispersion from reaction stage d) is reacted with 0.025 to 4 parts by weight of a chain-extending component (F). The reaction stage e) is carried out at a temperature of 20 to 80° C., preferably at 30 to 50° C. According to a preferred embodiment, the chain-extending component (F) is used in an amount such that the degree of chain extension, based on the free isocyanate groups of the polyurethane prepolymer, is 10 to 100 equivalent %, preferably 50 to 100 equivalent %. In the reaction stage e), the chain-extending component (F) is dissolved in a ratio of 1:10 to 10:1 in proportions of the dispersing medium taken beforehand and is then added. The chain extension of the polyurethane prepolymer dispersion leads to an increase in the molar mass within the micelles and to the formation of a polyurethane/polyurea dispersion of high molar mass. The chain-extending component (F) reacts with reactive isocyanate groups substantially more rapidly than water. After the reaction stage e), any free isocyanate groups still present can all be subjected to chain extension with water. Alternatively, the chain-extending component (F) can, if required, also be used in reaction stage d) as a prepared mixture with water, the neutralizing component (D) and the antifoam component (E).

The chain-extending component (F) consists of at least one polyamine having two or more amino groups reactive toward polyisocyanates. Suitable polyamines are, for example, adipic acid dihydrazide, ethylenediamine, diethylenetriamine, triethylenetetramine, tetraethylenepentamine, pentaethylenehexamine, dipropylenetriamine, hexamethylenediamine, hydrazine, isophoronediamine, N-(2-aminoethyl)-2-aminoethanol, adducts of salts of 2-acrylamido-2-methylpropane-1-sulfonic acid (AMPS) and ethylenediamine, adducts of salts of (meth)acrylic acid and ethylenediamine or any desired combinations of these polyamines. Difunctional primary amines and in particular ethylenediamine are preferably used.

The processing time between the end of the stage c) and the end of the stage e) is preferably less than 1 hour, in particular less than 30 minutes.

The solids content of the polyurethane polymer consisting of the components (A), (C), (D) and (F) is adjusted in particular to 20 to 50 parts by weight, preferably to 30 to 40 parts by weight, based on the total amount of the pure polyurethane dispersion.

The content of carboxylate groups in the polyurethane polymer consisting of the components (A), (C), (D) and (F) is adjusted in particular to 10 to 50 meq.$(100\ g)^{-1}$, preferably to 15 to 35 meq.$(100\ g)^{-1}$.

The mean particle size of the micelles of the polyurethane polymer consisting of the components (A), (C), (D) and (F) is in particular 100 to 500 nm, preferably 200 to 400 nm. The corresponding data relate to measurements with the aid of photon correlation spectroscopy (PCS).

The polyurethane polymer has, as a rule, an average molar mass of 25,000 to 250,000 Dalton. The corresponding data relate to the number average $M_n$ and measurements with the aid of gel permeation chromatography (GPC).

The method according to the invention is a universal method for producing tailor-made self-emulsifiable aqueous polyurethane resins. The low technical requirements of the method permit a high throughput and a simple procedure in combination with low costs. Moreover, the reproducibility of the method and the storage stability of the products should be singled out. In addition, polyurethane prepolymers of high viscosity can be easily dispersed. For production in industry, only a simple polymerization apparatus consisting of a stirred kettle and a dissolver is required. This configuration corresponds to the prepolymer mixing process.

In the case of comparable formulations, the method according to the invention for producing self-emulsifiable aqueous polyurethane resins is distinguished from conventional methods by higher solids contents, lower viscosities, excellent material characteristics (such as, for example, elongation, tensile strength and hardness) and its relatively simple technical feasibility.

The self-emulsifiable, aqueous polyurethane resins according to the invention can be used in the building sector as binders for one-component and two-component coatings, sealants, adhesives, finishes or membranes, sport floor coverings and seals for the surfaces of mineral building materials, such as concrete, gypsum or cement, and glass, wood, paper, metal or plastic. The self-emulsifiable aqueous polyurethane resins according to the invention and the construction-chemical products produced therefrom are applied by the methods known from coating technology, such as, for example, flooding, pouring, knife coating, spraying, brushing, dipping and roll-coating.

The examples below are intended to illustrate the invention in more detail.

EXAMPLE 1

Polyurethane Dispersion Based on a Polypropylene Glycol having a Molar Mass of 2000 Dalton Variant 1A (Comparative Example)

A homogeneous polyol mixture consisting of 100.00 g of a polypropylene glycol (trade name: Voranol P 2000 from Dow Chemical), 6.00 g of 2-methyl-1,3-propanediol (trade name MPDiol Glycol® from Arco Chemical), 3.00 g of trimethylolpropane (from Aldrich), 6.50 g of dimethylolpropionic acid (trade name: DMPA® from Mallinckrodt) and 30.00 g of N-methylpyrrolidone (from Aldrich) was prepared at a temperature of 70 to 80° C. in a four-necked flask equipped with a KPG stirrer, a reflux condenser, a thermometer and a nitrogen blanketing means. 61.77 g of isophorone diisocyanate were then added. The mixture was stirred while blanketing with nitrogen at 80 to 90° C. until the exothermic reaction had ceased and the calculated NCO content had been reached (theory: 3.22% by weight, NCO/OH=1.40). The course of the reaction was monitored acidimetrically. 180.00 g of the prepolymer were then dispersed, with thorough stirring, in a mixture of 222.29 g of water, 4.26 g of triethylamine (100 equivalent %) (indirect neutralization) and 0.71 g of antifoam BYK 024. To produce the polyurethane dispersion, chain extension was effected using a mixture of 2.90 g of ethylenediamine (70 equivalent %) and 14.52 g of water.

A stable, translucent polyurethane dispersion was obtained. The data and material characteristics of the polyurethane dispersion from example 1A are summarized in table 1.

Variant 1B (Invention)

A homogeneous polyol mixture consisting of 100.00 g of a polypropylene glycol (trade name: Voranol P 2000 from Dow Chemical), 6.00 g of 2-methyl-1,3-propanediol (trade name MPDiol Glycol® from Arco Chemical), 3.00 g of trimethylolpropane (from Aldrich), 6.50 g of dimethylolpropionic acid (trade name: DMPA® from Mallinckrodt) and 30.00 g of N-methylpyrrolidone (from Aldrich) was prepared at a temperature of 70 to 80° C. in a four-necked flask equipped with a KPG stirrer, a reflux condenser, a thermometer and a nitrogen blanketing means. 76.0 g of the previously prepared polyol mixture were then added to 61.77 g of isophorone diisocyanate. This mixture was stirred while blanketing with nitrogen at 80 to 90° C. until the weakly exothermic reaction had ceased and the calculated NCO content (NCO/OH=2.68) of this reaction stage had been reached. After the addition of the second half (69.5 g) of the polyol mixture, stirring was effected while blanketing with nitrogen at 80 to 90° C. until the calculated NCO content of this reaction stage (NCO/OH=1.84) or the NCO content of the overall reaction (theory: 3.22% by weight; NCO/OH= 1.40) had been reached. The course of the reaction was monitored acidimetrically. 180.00 g of the prepolymer were then dispersed, with thorough stirring, in a mixture of 222.29 g of water, 4.26 g of triethylamine (100 equivalent %) (indirect neutralization) and 0.71 g of antifoam BYK 024. To produce the polyurethane dispersion, chain extension was effected using a mixture of 2.90 g of ethylenediamine (70 equivalent %) and 14.52 g of water.

A stable, translucent polyurethane dispersion was obtained. The data and material characteristics of the polyurethane dispersion from example 1B are summarized in table 1.

Variant 1C (Invention)

A homogeneous polyol mixture consisting of 100.00 g of a polypropylene glycol (trade name: Voranol P 2000 from Dow Chemical), 6.00 g of 2-methyl-1,3-propanediol (trade name MPDiol Glycol® from Arco Chemical), 6.50 g of dimethylolpropionic acid (trade name: DMPA® from Mallinckrodt) and 20.00 g of N-methylpyrrolidone (from Aldrich) was prepared at a temperature of 70 to 80° C. in a four-necked flask equipped with a KPG stirrer, a reflux condenser, a thermometer and a nitrogen blanketing means. 61 g of the previously prepared polyol mixture were then added to 61.77 g of isophorone diisocyanate. This mixture was stirred while blanketing with nitrogen at 80 to 90° C. until the weakly exothermic reaction had ceased and the calculated NCO content (NCO/OH=3.11) of this reaction stage had been reached. After the addition of the remaining 74.5 g of the polyol mixture, stirring was effected while blanketing with nitrogen at 80 to 90° C. until the calculated NCO content of this reaction stage (NCO/OH=1.73) or the NCO content of the overall reaction (theory: 3.38% by weight; NCO/OH=1.40) had been reached. The course of the reaction was monitored acidimetrically. 197.27 g of the prepolymer were then covered—without stirring—with a layer of a mixture of 230.27 g of water, 4.90 g of triethylamine (100 equivalent %) (indirect neutralization) and 0.74 g of antifoam BYK 024 and then completely dispersed with thorough stirring in the dissolver within 1 minute. To produce the polyurethane dispersion, chain extension was effected using a mixture of 3.34 g of ethylenediamine (70 equivalent %) and 16.68 g of water.

A stable, translucent and blue-tinged opaque polyurethane dispersion was obtained. The data and material characteristics of the polyurethane dispersion from example 1C are summarized in table 1.

TABLE 1

Example 1 with variants 1A, 1B and 1C

| Example 1 | Variant 1A (comparative example) | Variant 1B (invention) | Variant 1C (invention) |
|---|---|---|---|
| Appearance | semi-translucent | semi-translucent | semi-translucent, blue-tinged opaque |
| Solids content | 38% by weight | 38% by weight | 41% by weight |
| pH | 7.25 | 7.30 | 7.20 |
| NMP content | 6.1% by weight | 6.1% by weight | 4.4% by weight |
| Elongation at the tensile strength | 405% | 446% | 492% |
| Tensile strength | 11.6 MPa | 13.3 MPa | 14.7 MPa |
| König hardness (DIN 53 157) | 25 s | 29 s | 31 s |

EXAMPLE 2

Polyurethane Dispersion Based on a Polyesterdiol having a Molar Mass of 2000 Dalton Variant 2A (Comparative Example)

100.00 g of a polyesterdiol (trade name: Bester 42H from Poliolchimica), 15.00 g of 1,4-butanediol (from Aldrich), 15.00 g of dimethylolpropionic acid (trade name: DMPA® from Mallinckrodt) and 50.00 g of N-methylpyrrolidone (from Aldrich) were initially introduced into a four-necked flask equipped with a KPG stirrer, a reflux condenser, a thermometer and a nitrogen blanketing means and were mixed, and 101.92 g of isophorone diisocyanate were added. The mixture was stirred while blanketing with nitrogen at 80 to 90° C. until the exothermic reaction had ceased and the calculated NCO content (theory: 3.91% by weight; NCO/OH=1.40) had been reached. The course of the reaction was monitored acidimetrically. 250.00 g of the prepolymer were then dispersed, with thorough stirring in a mixture of 261.50 g of water, 10.03 g of triethylamine (100 equivalent %) (indirect neutralization) and 0.72 g of antifoam BYK 024. To produce the polyurethane dispersion, chain extension was effected using a mixture of 5.06 g of ethylenediamine (70 equivalent %) and 25.30 g of water.

A stable, translucent polyurethane dispersion was obtained. The data and material characteristics of the polyurethane dispersion from example 2A are summarized in table 2.

Variant 2B (Invention)

A homogeneous polyol mixture consisting of 100.00 g of a polyesterdiol (trade name: Bester 42H from Poliolchimica), 15.00 g of 1,4-butanediol (from Aldrich), 15.00 g of dimethylolpropionic acid (trade name: DMPA® from Mallinckrodt) and 50.00 g of N-methylpyrrolidone (from Aldrich) was prepared at a temperature of 70 to 80° C. in a four-necked flask equipped with a KPG stirrer, a reflux condenser, a thermometer and a nitrogen blanketing means. 90 g of the previously prepared polyol mixture were then added to 101.92 g of isophorone diisocyanate. This mixture was stirred while blanketing with nitrogen at 80 to 90° C. until the weakly exothermic reaction had ceased and the calculated NCO content (NCO/OH=2.80) of this reaction stage had been reached. After the addition of the second half (90 g) of the polyol mixture, stirring was effected while blanketing with nitrogen at 80 to 90° C. until the calculated NCO content of this reaction stage (NCO/OH=1.80) or the NCO content of the overall reaction (theory: 3.91% by weight; NCO/OH=1.40) had been reached. The course of the reaction was monitored acidimetrically.

250.00 g of the prepolymer were then dispersed, with thorough stirring, in a mixture of 261.50 g of water, 10.03 g of triethylamine (100 equivalent %) (indirect neutralization) and 0.72 g of antifoam BYK 024. To produce the polyurethane dispersion, chain extension was effected using a mixture of 5.06 g of ethylenediamine (70 equivalent %) and 25.30 g of water.

A stable, translucent polyurethane dispersion was obtained. The data and material characteristics of the polyurethane dispersion from example 2B are summarized in table 2.

Variant 2C (Invention)

A homogeneous polyol mixture consisting of 100.00 g of a polyesterdiol (trade name: B 42H from Poliolchimica), 15.00 g of 1,4-butanediol (from Aldrich), 15.00 g of dimethylolpropionic acid (trade name: DMPA® from Mallinckrodt) and 40.00 g of N-methylpyrrolidone (from Aldrich) was prepared at a temperature of 70 to 80° C. in a four-necked flask equipped with a KPG stirrer, a reflux condenser, a thermometer and a nitrogen blanketing means. 68 g of the previously prepared polyol mixture were then added to 101.92 g of isophorone diisocyanate. This mixture was stirred while blanketing with nitrogen at 80 to 90° C. until the weakly exothermic reaction had ceased and the calculated NCO content (NCO/OH=3.50) of this reaction stage had been reached. After the addition of the remaining 102 g of the polyol mixture, stirring was effected while blanketing with nitrogen at 80 to 90° C. until the calculated NCO content of this reaction stage (NCO/OH=1.66) or the NCO content of the overall reaction (theory: 3.91% by weight; NCO/OH=1.40) had been reached. The course of the reaction was monitored acidimetrically.

271.92 g of the prepolymer were then covered—without stirring—with a mixture of 275.98 g of water, 11.32 g of triethylamine (100 equivalent %) (indirect neutralization) and 0.76 g of antifoam BYK 024 and then completely dispersed with thorough stirring in the dissolver within 1 minute. To produce the polyurethane dispersion, chain extension was effected using a mixture of 5.51 g of ethylenediamine (70 equivalent %) and 27.53 g of water.

A stable, translucent and blue-tinged opaque polyurethane dispersion was obtained. The data and material characteristics of the polyurethane dispersion from example 2C are summarized in table 2.

TABLE 2

Example 2 with variants 2A, 2B and 2C

| Example 2 | Variant 2A (comparative example) | Variant 2B (invention) | Variant 2C (invention) |
|---|---|---|---|
| Appearance | semi-translucent | semi-translucent | semi-translucent, blue-tinged opaque |
| Solids content | 40% by weight | 40% by weight | 42% by weight |
| pH | 7.30 | 7.35 | 7.20 |
| NMP content | 8.0% by weight | 8.0% by weight | 6.75% by weight |
| Elongation at the tensile strength | 335% | 383% | 405% |
| Tensile strength | 38.8 MPa | 42.2 MPa | 48.0 MPa |
| Konig hardness (DIN 53 157) | 107 s | 120 s | 130 s |

EXAMPLE 3
Polyurethane Dispersion Based on a Polycarbonate-diol having a Molar Mass of 2000 Dalton
Variant 3A (Comparative Example)

100.00 g of a polycarbonate-diol (trade name: Desmophen C200 from Bayer), 9.00 g of 1,4-butanediol (from Aldrich), 14.00 g of dimethylolpropionic acid (trade name: DMPA® from Mallinckrodt) and 35.00 g of N-methylpyrrolidone (from Aldrich) were initially introduced into a four-necked flask equipped with a KPG stirrer, a reflux condenser, a thermometer and a nitrogen blanketing means and were mixed, and 79.09 g of isophorone diisocyanate were added. The mixture was stirred while blanketing with nitrogen at 80 to 90° C. until the exothermic reaction had ceased and the calculated NCO content (theory: 3.60% by weight; NCO/OH=1.40) had been reached. The course of the reaction was monitored acidimetrically. 220.00 g of the prepolymer were then dispersed, with thorough stirring in a mixture of 249.64 g of water, 9.80 g of triethylamine (100 mol %) (indirect neutralization) and 0.67 g of antifoam BYK 024. To produce the polyurethane dispersion, chain extension was effected using a mixture of 3.96 g of ethylenediamine (70 equivalent %) and 19.81 g of water.

A stable, translucent polyurethane dispersion was obtained. The data and material characteristics of the polyurethane dispersion from example 3A are summarized in table 3.

Variant 3B (Invention)

A homogeneous polyol mixture consisting of 100.00 g of a polycarbonate-diol (trade name: Desmophen C200 from Bayer), 9.00 g of 1,4-butanediol (from Aldrich), 14.00 g of dimethylolpropionic acid (trade name: DMPA® from Mallinckrodt) and 35.00 g of N-methylpyrrolidone (from Aldrich) was prepared at a temperature of 70 to 80° C. in a four-necked flask equipped with a KPG stirrer, a reflux condenser, a thermometer and a nitrogen blanketing means. 75 g of the previously prepared polyol mixture were then added to 79.09 g of isophorone diisocyanate. This mixture was stirred while blanketing with nitrogen at 80 to 90° C. until the weakly exothermic reaction had ceased and the calculated NCO content (NCO/OH=2.95) of this reaction stage had been reached. After the addition of the remaining 83 g of the polyol mixture, stirring was effected while blanketing with nitrogen at 80 to 90° C. until the calculated NCO content of this reaction stage (NCO/OH=1.76) or the NCO content of the overall reaction (theory: 3.60% by weight; NCO/OH=1.40) had been reached. The course of the reaction was monitored acidimetrically. 220.00 g of the prepolymer were then dispersed, with thorough stirring, in a mixture of 249.64 g of water, 9.80 g of triethylamine (100 mol %) (indirect neutralization) and 0.67 g of antifoam BYK 024. To produce the polyurethane dispersion, chain extension was effected using a mixture of 3.96 g of ethylenediamine (70 equivalent %) and 19.81 g of water.

A stable, translucent polyurethane dispersion was obtained. The data and material characteristics of the polyurethane dispersion from example 3B are summarized in table 3.

Variant 3C (Invention)

A homogeneous polyol mixture consisting of 100.00 g of a polycarbonate-diol (trade name: Desmophen C200 from Bayer), 9.00 g of 1,4-butanediol (from Aldrich), 14.00 g of dimethylolpropionic acid (trade name: DMPA® from Mallinckrodt) and 20.00 g of N-methylpyrrolidone (from Aldrich) was prepared at a temperature of 70 to 80° C. in a four necked flask equipped with a KPG stirrer, a reflux condenser, a thermometer and a nitrogen blanketing means. 66 g of the previously prepared polyol mixture were then added to 79.09 g of isophorone diisocyanate. This mixture was stirred while blanketing with nitrogen at 80 to 90° C. until the weakly exothermic reaction had ceased and the calculated NCO content (NCO/OH=3.35) of this reaction stage had been reached. After the addition of the remaining 92 g of the polyol mixture, stirring was effected while blanketing with nitrogen at 80 to 90° C. until the calculated NCO content of this reaction stage (NCO/OH=1.69) or the NCO content of the overall reaction (theory: 3.85% by weight; NCO/OH=1.40) had been reached. The course of the reaction was monitored acidimetrically. 222.09 g of the prepolymer were then covered—without stirring—with layer of a mixture of 223.55 g of water, 10.56 g of triethylamine (100 mol %) (indirect neutralization) and 0.61 g of antifoam BYK 024 and then completely dispersed with thorough stirring in the dissolver within 1 minute. To produce the polyurethane dispersion, chain extension was effected using a mixture of 4.33 g of ethylenediamine (70 equivalent %) and 21.65 g of water.

A stable, translucent and blue-tinged opaque polyurethane dispersion was obtained. The data and material characteristics of the polyurethane dispersion from example 3C are summarized in table 3.

TABLE 3

Example 3 with variants 3A, 3B and 3C

| Example 3 | Variant 3A (comparative example) | Variant 3B (invention) | Variant 3C (invention) |
|---|---|---|---|
| Appearance | semi- | semi- | semi- |

TABLE 3-continued

Example 3 with variants 3A, 3B and 3C

| Example 3 | Variant 3A (comparative example) | Variant 3B (invention) | Variant 3C (invention) |
|---|---|---|---|
| | translucent | translucent | translucent, blue-tinged opaque |
| Solids content | 40% by weight | 40% by weight | 42% by weight |
| pH | 7.34 | 7.28 | 7.30 |
| NMP content | 6.45% by weight | 6.45% by weight | 4.14% by weight |
| Elongation at the tensile strength | 305% | 297% | 369% |
| Tensile strength | 41.8 MPa | 43.4 MPa | 50.5 MPa |
| König hardness (DIN 53 157) | 101 s | 96 s | 115 s |

EXAMPLE 4

Polyurethane Dispersion Based on Polyesterdiol having a Molar Mass of 2000 Dalton and an α,ω-poly(n-butyl methacrylate)-diol having a Molar Mass of 1000 Dalton Variant 4A (Comparative Example)

50.00 g of a polyesterdiol (trade name: Bester 42H from Poliolchimica), 50.00 g of an α,ω-poly(n-butyl methacrylate)-diol (trade name: TEGO® Diol BD-1000 from Tego Chemie Service GmbH), 15.00 g of dimethylolpropionic acid (trade name: DMPA® from Mallinckrodt) and 45.00 g of N-methylpyrrolidone (from Aldrich) were initially introduced into a four-necked flask equipped with a KPG stirrer, a reflux condenser, a thermometer and a nitrogen blanketing means and were mixed, and 110.05 g of isophorone diisocyanate were added. The mixture was stirred while blanketing with nitrogen at 80 to 90° C. until the exothermic reaction had ceased and the calculated NCO content (theory: 4.10% by weight; NCO/OH=1.40) had been reached. The course of the reaction was monitored acidimetrically.

260.00 g of the prepolymer were then dispersed, with thorough stirring in a mixture of 310.49 g of water, 10.32 g of triethylamine (100 mol %) (indirect neutralization) and 1.43 g of antifoam BYK 024. To produce the polyurethane dispersion, chain extension was effected using a mixture of 5.32 g of ethylenediamine (70 equivalent %) and 47.92 g of water.

A stable, translucent polyurethane dispersion was obtained. The data and material characteristics of the polyurethane dispersion from example 4A are summarized in table 4.

Variant 4B (Invention)

A homogeneous polyol mixture consisting of 50.00 g of a polyesterdiol (trade name: Bester 42H from Poliolchimica), 50.00 g of an α,ω-poly(n-butyl methacrylate)-diol (trade name: TEGO® Diol BD-1000 from Tego Chemie Service GmbH), 15.00 g of 1,4-butanediol (from Aldrich), 15.00 g of dimethylolpropionic acid (trade name: DMPA® from Mallinckrodt) and 45.00 g of N-methylpyrrolidone (from Aldrich) was prepared at a temperature of 70 to 80° C. in a four-necked flask equipped with a KPG stirrer, a reflux condenser, a thermometer and a nitrogen blanketing means. 95 g of the previously prepared polyol mixture were then added to 110.05 g of isophorone diisocyanate. This mixture was stirred while blanketing with nitrogen at 80 to 90° C. until the weakly exothermic reaction had ceased and the calculated NCO content (NCO/OH=2.78) of this reaction stage had been reached. After the addition of the remaining 80 g of the polyol mixture, stirring was effected while blanketing with nitrogen at 80 to 90° C. until the calculated NCO content of this reaction stage (NCO/OH=2.11) or the NCO content of the overall reaction (theory: 4.17% by weight; NCO/OH=1.40) had been reached. The course of the reaction was monitored acidimetrically.

260.00 g of the prepolymer were then dispersed, with thorough stirring, in a mixture of 310.49 g of water, 10.32 g of triethylamine (100 mol %) (indirect neutralization) and 1.43 g of antifoam BYK 024. To produce the polyurethane dispersion, chain extension was effected using a mixture of 5.32 g of ethylenediamine (70 equivalent %) and 47.92 g of water.

A stable, translucent polyurethane dispersion was obtained. The data and material characteristics of the polyurethane dispersion from example 4B are summarized in table 4.

Variant 4C (Invention)

A homogeneous polyol mixture consisting of 50.00 g of a polyesterdiol (trade name: Bester 42H from Poliolchimica), 50.00 g of an α,ω-poly(n-butyl methacrylate)-diol (trade name: TEGO® Diol BD-1000 from Tego Chemie Service GmbH), 15.00 g of 1,4-butanediol (from Aldrich), 15.00 g of dimethylolpropionic acid (trade name: DMPA® from Mallinckrodt) and 35.00 g of N-methylpyrrolidone (from Aldrich) was prepared at a temperature of 70 to 80° C. in a four-necked flask equipped with a KPG stirrer, a reflux condenser, a thermometer and a nitrogen blanketing means. 77 g of the previously prepared polyol mixture were then added to 110.05 g of isophorone diisocyanate. This mixture was stirred while blanketing with nitrogen at 80 to 90° C. until the weakly exothermic reaction had ceased and the calculated NCO content (NCO/OH=3.23) of this reaction stage had been reached. After the addition of the remaining 88 g of the polyol mixture, stirring was effected while blanketing with nitrogen at 80 to 90° C. until the calculated NCO content of this reaction stage (NCO/OH=1.95) or the NCO content of the overall reaction (theory: 4.32% by weight; NCO/OH=1.40) had been reached. The course of the reaction was monitored acidimetrically.

275.05 g of the prepolymer were then covered—without stirring—with a layer of a mixture of 266.77 g of water, 11.32 g of triethylamine (100 mol %) (indirect neutralization) and 1.28 g of antifoam BYK 024 and then completely dispersed with thorough stirring in a dissolver within 1 minute. To produce the polyurethane dispersion, chain extension was effected using a mixture of 5.95 g of ethylenediamine (70 equivalent %) and 53.57 g of water.

A stable, translucent and blue-tinged opaque polyurethane dispersion was obtained. The data and material characteristics of the polyurethane dispersion from example 4C are summarized in table 4.

TABLE 4

Example 4 with variants 4A, 4B and 4C

| Example 4 | Variant 4A (comparative example) | Variant 4B (invention) | Variant 4C (invention) |
|---|---|---|---|
| Appearance | semi-translucent | semi-translucent | semi-translucent, blue-tinged |

TABLE 4-continued

Example 4 with variants 4A, 4B and 4C

| Example 4 | Variant 4A (comparative example) | Variant 4B (invention) | Variant 4C (invention) |
|---|---|---|---|
| Solids content | 37% by weight | 37% by weight | opaque 42% by weight |
| pH | 7.25 | 7.32 | 7.22 |
| NMP content | 6.46% by weight | 6.46% by weight | 5.70% by weight |
| Elongation at the tensile strength | 20% | 38% | 156% |
| Tensile strength | 3.8 MPa | 10.4 MPa | 49.9 MPa |
| König hardness (DIN 53 157) | 143 s | 143 s | 163 s |

EXAMPLE 5

Polyurethane Dispersion Based on a Polypropylene Glycol having a Molar Mass of 2000 Dalton and an α,ω-poly(n-butyl methacrylate)-diol having a Molar Mass of 1000 Dalton Variant 5A (Comparative Example)

50.00 g of a polypropylene glycol (trade name: Voranol P 2000 from Dow Chemical), 50.00 g of an α,ω-poly(n-butyl methacrylate)-diol (trade name: TEGO® Diol BD-1000 from Tego Chemie Service GmbH), 15.00 g of 1,4-butanediol (from Aldrich), 15.00 g of dimethylolpropionic acid (trade name: DMPA® from Mallinckrodt) and 45.00 g of N-methylpyrrolidone (from Aldrich) were initially introduced into a four-necked flask equipped with a KPG stirrer, a reflux condenser, a thermometer and a nitrogen blanketing means and were mixed, and 110.15 g of isophorone diisocyanate were added. The mixture was stirred while blanketing with nitrogen at 80 to 90° C. until the exothermic reaction had ceased and the calculated NCO content (theory: 4.17% by weight; NCO/OH=1.40) had been reached. The course of the reaction was monitored acidimetrically.

260.00 g of the prepolymer were then dispersed, with thorough stirring in a mixture of 309.81 g of water, 10.32 g of triethylamine (100 mol %) (indirect neutralization) and 1.43 g of antifoam BYK 024. To produce the polyurethane dispersion, chain extension was effected using a mixture of 5.42 g of ethylenediamine (70 equivalent %) and 48.8 g of water.

A stable, translucent polyurethane dispersion was obtained. The data and material characteristics of the polyurethane dispersion from example 5A are summarized in table 5.

Variant 5B (Invention)

A homogeneous polyol mixture consisting of 50.00 g of a polypropylene glycol (trade name: Voranol P 2000 from Dow Chemical), 50.00 g of an α,ω-poly(n-butyl methacrylate)-diol (trade name: TEGO® Diol BD-1000 from Tego Chemie Service GmbH), 15.00 g of 1,4-butanediol (from Aldrich), 15.00 g of dimethylolpropionic acid (trade name: DMPA® from Mallinckrodt) and 45.00 g of N-methylpyrrolidone (from Aldrich) was prepared at a temperature of 70 to 80° C. in a four-necked flask equipped with a KPG stirrer, a reflux condenser, a thermometer and a nitrogen blanketing means. 84 g of the previously prepared polyol mixture were then added to 110.15 g of isophorone diisocyanate. This mixture was stirred while blanketing with nitrogen at 80 to 90° C. until the weakly exothermic reaction had ceased and the calculated NCO content (NCO/OH=3.15) of this reaction stage had been reached. After the addition of the remaining 80 g of the polyol mixture, stirring was effected while blanketing with nitrogen at 80 to 90° C. until the calculated NCO content of this reaction stage (NCO/OH=1.98) or the NCO content of the overall reaction (theory: 4.17% by weight; NCO/OH=1.40) had been reached. The course of the reaction was monitored acidimetrically.

260.00 g of the prepolymer were then dispersed, with thorough stirring, in a mixture of 309.81 g of water, 10.32 g of triethylamine (100 mol %) (indirect neutralization) and 1.43 g of antifoam BYK 024. To produce the polyurethane dispersion, chain extension was effected using a mixture of 5.42 g of ethylenediamine (70 equivalent %) and 48.8 g of water.

A stable, translucent polyurethane dispersion was obtained. The data and material characteristics of the polyurethane dispersion from example 5B are summarized in table 5.

Variant 5C (Invention)

A homogeneous polyol mixture consisting of 50.00 g of a polypropylene glycol (trade name: Voranol P 2000 from Dow Chemical), 50.00 g of an α,ω-poly(n-butyl methacrylate)-diol (trade name: TEGO® Diol BD-1000 from Tego Chemie Service GmbH), 15.00 g of 1,4-butanediol (from Aldrich), 15.00 g of dimethylolpropionic acid (trade name: DMPA® from Mallinckrodt) and 30.00 g of N-methylpyrrolidone (from Aldrich) was prepared at a temperature of 70 to 80° C. in a four-necked flask equipped with a KPG stirrer, a reflux condenser, a thermometer and a nitrogen blanketing means. 71 g of the previously prepared polyol mixture were then added to 110.15 g of isophorone diisocyanate. This mixture was stirred while blanketing with nitrogen at 80 to 90° C. until the weakly exothermic reaction had ceased and the calculated NCO content (NCO/OH=3.40) of this reaction stage had been reached. After the addition of the remaining 89 g of the polyol mixture, stirring was effected while blanketing with nitrogen at 80 to 90° C. until the calculated NCO content of this reaction stage (NCO/OH=1.92) or the NCO content of the overall reaction (theory: 4.41% by weight; NCO/OH=1.40) had been reached. The course of the reaction was monitored acidimetrically.

270.15 g of the prepolymer were then covered—without stirring—with a layer of a mixture of 272.01 g of water, 11.32 g of triethylamine (100 mol %) (indirect neutralization) and 1.30 g of antifoam BYK 024 and then completely dispersed with thorough stirring in a dissolver within 1 minute. To produce the polyurethane dispersion, chain extension was effected using a mixture of 5.94 g of ethylenediamine (70 equivalent %) and 53.45 g of water.

A stable, translucent and blue-tinged opaque polyurethane dispersion was obtained. The data and material characteristics of the polyurethane dispersion from example 5C are summarized in table 5.

TABLE 5

Example 5 with variants 5A, 5B and 5C

| Example 5 | Variant 5A (comparative example) | Variant 5B (invention) | Variant 5C (invention) |
|---|---|---|---|
| Appearance | semi-translucent | semi-translucent | semi-translucent, blue-tinged opaque |

TABLE 5-continued

Example 5 with variants 5A, 5B and 5C

| Example 5 | Variant 5A (comparative example) | Variant 5B (invention) | Variant 5C (invention) |
|---|---|---|---|
| Solids content | 37% by weight | 37% by weight | 42% by weight |
| pH | 7.36 | 7.39 | 7.42 |
| NMP content | 6.45% by weight | 6.45% by weight | 4.88% by weight |
| Elongation at the tensile strength | 19% | 78% | 176% |
| Tensile strength | 6.2 MPa | 15.9 MPa | 29.3 MPa |
| König hardness (DIN 53 157) | 133 s | 133 s | 152 s |

EXAMPLE 6

Solvent-free Polyurethane Dispersion Based on a Polypropylene Glycol having a Molar Mass of 2000 Dalton (Invention)

A mixture of 100.00 g of a polypropylene glycol having a hydroxyl number of 56.1 mg KOH·g$^{-1}$ (trade name Acclaim® 2200 from Arco Chemical, low monol type) and 35.49 g of isophorone diisocyanate (trade name Vestanat IPDI from Hüls) was stirred while blanketing with nitrogen for 2 h at 80–90° C. in the presence of 0.1 g of dibutyltin dilaurate (DBTL) as a catalyst in a four-necked flask equipped with a KPG stirrer, a reflux condenser, a thermometer and a nitrogen blanketing means. After addition of 4.00 g of finely milled dimethylolpropionic acid (trade name DMPA® from Mallinckrodt) to the preadduct, the mixture was further stirred while blanketing with nitrogen at 80–90° C. until the calculated NCO content had been reached (theory: 4.81% by weight; NCO/OH=2.00). The course of the reaction was monitored acidimetrically.

After cooling to 60° C., the prepolymer was directly neutralized with 2.72 g (90 equivalent %) of triethylamine. 142.21 g of the prepolymer were then covered—without stirring—with a layer of 146.04 g of water and then completely dispersed with thorough stirring in a dissolver within 1 minute. To produce the polyurethane dispersion, chain extension was effected using 3.83 g (80 equivalent %) of ethylenediamine.

A stable, milky white polyurethane dispersion was obtained. The data and material characteristics of the polyurethane dispersion from example 6 are summarized in table 6.

EXAMPLE 7

Polyurethane Dispersion Based on a Polycarbonate-diol having a Molar Mass of 2000 Dalton (Invention)

A mixture of 100.00 g of a polycarbonate-diol having a hydroxyl number of 56.1 mg KOH·g$^{-1}$ (trade name Desmophen® C200 from Bayer), 15.16 g of N-methylpyrrolidone and 40.89 g of isophorone diisocyanate (trade name Vestanat IPDI from Hüls) was stirred while blanketing with nitrogen for 2 h at 80–90° C. in the presence of 0.1 g of dibutyltin dilaureate (DBTL) as a catalyst in a four-necked flask equipped with a KPG stirrer, a reflux condenser, a thermometer and a nitrogen blanketing means. After addition of 5.63 g of finely milled dimethylolpropionic acid (trade name DMPA® from Mallinckrodt) to the preadduct, the mixture was further stirred while blanketing with nitrogen at 80–90° C. until the calculated NCO content had been reached (theory: 4.78% by weight, NCO/OH=2.00). The course of the reaction was monitored acidimetrically.

165.50 g of the prepolymer were then covered—without stirring—with a layer of a mixture of 169.92 g of water and 3.82 g (90 equivalent %) of triethylamine (direct neutralization) and then completely dispersed with thorough stirring in a dissolver within 1 minute. To produce the polyurethane dispersion, chain extension was effected using 4.42 g (80 equivalent %) of ethylenediamine.

A stable, milky white polyurethane dispersion was obtained. The data and material characteristics of the polyurethane dispersion from example 7 are summarized in table 6.

TABLE 6

Examples 6 and 7

| Examples | 6 | 6 Comparison* | 7 | 7 Comparison* |
|---|---|---|---|---|
| Appearance | milky white | milky white | milky white | milky white |
| Solids content | 50% by weight | 50% by weight | 50% by weight | 50% by weight |
| pH | 7.73 | 7.55 | 7.62 | 7.60 |
| NMP value | — | — | 4.46% by weight | 4.46% by weight |
| Elongation at the tensile strength | 808% | 705% | 356% | 300% |
| Tensile strength | 24.5 MPa | 23.6 MPa | 39.8 MPa | 28.5 MPa |
| König hardness (DIN 53 157) | 28 s | 25 s | 50 s | 43 s |

*Comparative example: conventional dispersing

Examples 1 to 7 show that, on changing over from the conventional method to the method according to the invention while using identical formulations, self-emulsifiable, aqueous polyurethane resins having higher solids contents, lower solvent contents and improved mechanical characteristics are obtained.

What is claimed is:

1. A method for producing self-emulsifiable, aqueous polyurethane resins comprising the steps of
   a) preparing a premix of polyol component (A), comprising 5 to 25 parts by weight of at least one diol (A) (i) having a molar mass of 500 to 5000 Dalton, 0.5 to 5 parts by weight of at least one polyhydroxyalkane; (A) (ii) 0 to 5 parts by weight of at least one anionically modifiable dihydroxyalkanecarboxylic acid (A) (iii); and 0 to 9 parts by weight of a solvent component (B);
   b) reacting 5 to 50 parts by weight of a polyisocyanate component (C) with 11 to 39 parts by weight of the premix from stage a) to give a polyurethane preadduct, the NCO/OH equivalent ratio in this stage being 1.75 to 8.0;
   c) reacting the polyurethane preadduct from stage b) with either 5 to 33 parts by weight of the premix from stage a) or 0.5 to 5 parts by weight of an anionically modifiable dihydroxyalkanecarboxylic acid (A) (iii) to give a polyurethane prepolymer, the NCO/OH equivalent ratio in this stage being 1.5 to 8.0, in particular 1.5 to 5.0;
   d) mixing the polyurethane prepolymer from stage c) with a prepared mixture of 0.5 to 4 parts by weight of a neutralizing component (D), and 0 to 1 part by weight of an antifoam component (E), and 5 to 225 parts by weight water taking proportions of this quantity of water to dilute a chain-extending component (F) in the ratio 1:10 to 10:1 by weight, and thereafter or simultaneously, e) reacting the aqueous polyurethane prepolymer from stage d) with 0.025 to 4 parts by weight of the chain-extending component (F), which has been diluted with water in stage d).

2. The method as claimed in claim 1, wherein diol component (A) (i) comprises linear polymeric diols having two hydroxyl groups reactive toward polyisocyanates and a molar mass of 1,000 to 4,000 Dalton.

3. The method as claimed in claim 2, wherein the linear polymeric diols selected from the group consisting of polyalkylene glycols, polyesterpolyols, and α,ω-dihydroxypolyolefins.

4. The method as claimed in claim 1, wherein the polyhydroxyalkane component (A) (ii) comprises low molecular weight polyols having two or more hydroxyl groups reactive toward polyisocyanates and a molar mass of 50 to 500 Dalton.

5. The method as claimed in claim 1, wherein the dihydroxyalkanecarboxylic acid (A) (iii) comprises low molecular weight compounds having two hydroxyl groups reactive toward polyisocyanates and one or more carboxyl group inert toward polyisocyanates and a molar mass of 100 to 200 Dalton.

6. The method as claimed in claim 5, wherein the dihydroxyalkanecarboxylic acid is dimethylolpropionic acid.

7. The method as claimed in claim 1, wherein the solvent component (B) comprises a hydrophilic organic solvent having a boiling point above 180° C. at atmospheric pressure.

8. The method as claimed in claim 7, wherein said hydrophilic organic solvent having a boiling point above 180° C. at atmospheric pressure is N-methylpyrrolidone.

9. The method as claimed in claim 1, wherein the polyisocyanate component (C) is at least one polyisocyanate, polyisocyanate derivative or polyisocyanate homolog having two or more aliphatic or aromatic isocyanate groups.

10. The method as claimed in claim 9, wherein the aliphatic polyisocyanate is isophorone diisocyanate.

11. The process as claimed in claim 1, wherein the neutralizing component (D) comprises ammonia, tertiary amines or alkali metal hydroxides.

12. The method as claimed in claim 11, wherein the tertiary amine is triethylamine.

13. The method as claimed in claim 12, wherein the chain-extending component (F) is at least one polyamine having two or more primary or secondary aliphatic amino groups reactive toward polyisocyanates.

14. The method as claimed in claim 13, wherein the aliphatic polyamine is ethylenediamine.

15. The method for producing the polyurethane resin as claimed in claim 1, wherein stage a) is carried out at a temperature of 20 to 120° C.

16. The method as claimed in claim 1, wherein the NCO/OH equivalent ratio of the components (C) and (A) in stage b) is adjusted to a value of from 2.5 to 4.0.

17. The method as claimed in claim 1, wherein the stage b) is carried out at a temperature of 60 to 120° C.

18. The method as claimed in claim 1, wherein the NCO/OH equivalent ratio of the polyurethane preadduct from stage b) and of the component (A) is adjusted to a value of 1.6 to 3.0 in stage c).

19. The method as claimed in claim 1, wherein the stage c) is carried out at a temperature of 60 to 120° C.

20. The method as claimed in claim 1, wherein the NCO/OH equivalent ratio of the total amount of the components (A) and (C) is adjusted to a value of 1.2 to 2.2.

21. The method as claimed in claim 1, wherein stage b) optionally step c) is carried out in the presence of 0.01 to 1 part by weight, based on the total amount of the components (A), (B) and (C), of a catalyst customary for the polyaddition reactions with polyisocyanates.

22. The method as claimed in claim 1, wherein a premix of the components (A) (i), (A) (ii), (A) (iii) and, optionally (B) is prepared in stage a) and the premix in stage a) is then used in the stages b) and c).

23. The method as claimed in claim 1, wherein a premix of the components (A) (i), (A) (ii) and, optionally (B) is prepared in stage a), the premix from stage a) is then used completely in stage b) and the component (A) (iii) is reacted only in stage c).

24. The method as claimed in claim 1, wherein the neutralizing component (D) is added in an amount such that the degree of neutralization, based on the free carboxyl groups of the polyurethane prepolymer, is 70 to 100 equivalent %.

25. The method as claimed in claim 1, wherein in stage d), the polyurethane prepolymer from stage c) is covered with a layer of prepared mixture of water, the neutralizing component (D) and the antifoam component (E) and is then mixed.

26. The method as claimed in claim 1, wherein in stage d), the polyurethane prepolymer from stage c) is stirred into the prepared mixture of water, the neutralizing component (D) and the antifoam component (E).

27. The method as claimed in claim 1, wherein the neutralizing component (D) is stirred into the polyurethane prepolymer after stage c).

28. The method as claimed in claim 1, wherein the stage d) is carried out at a temperature of 20 to 80° C., in particular at 40 to 60° C.

29. The method as claimed in claim 1, wherein in stage e), the chain-extending component (F) is used in an amount such that the degree of chain extension, based on the free isocyanate groups of the polyurethane resin, is 10 to 100 equivalent %.

30. The method as claimed in claim 1, wherein the chain-extending component (F) is already provided in stage d) as a prepared mixture with water, neutralizing component (D) and antifoam component (E).

31. The method as claimed in claim 1, wherein stage e) is carried out at a temperature of 20 to 80° C.

32. The method as claimed in claim 1, wherein the processing time between the end of the stage c) and the end of the stage e) is less than 1 hour.

* * * * *